Dec. 27, 1927.

L. B. BERNHEIM 1,654,401

CERAMIC AND METHOD OF MAKING THE SAME

Filed May 11, 1927

Inventor:
Lynn B. Bernheim,
by Hazard and Miller
Attorneys.

Patented Dec. 27, 1927.

1,654,401

UNITED STATES PATENT OFFICE.

LYNN B. BERNHEIM, OF LOS ANGELES, CALIFORNIA, ASSIGNOR OF ONE-HALF TO SAMUEL BERNHEIM, OF LOS ANGELES, CALIFORNIA.

CERAMIC AND METHOD OF MAKING THE SAME.

Application filed May 11, 1927. Serial No. 190,499.

My invention relates to ceramics and method of making the same, and in particular to producing ceramic goods having a glazed surface with colored veins which may be either unicolored or variegated. By my method beautiful effects may be produced, porcelains or earthenware and the like assume the appearance of variegated marble.

My method applies to glazed ceramics and is based on a treatment in which the glaze of the ceramics is first crazed, that is, minute cracks are made throughout the glaze. The ceramic is then subjected to a treatment with a liquid coloring matter which will penetrate through the glaze and be deposited therein. If the treatment is prolonged the coloring matter, preferably dye, will diffuse at least in part into the unglazed body of the ceramic thereby producing a wider band of color, dimmer in shade, which forms a pleasing contrast with the distinct hairlike bright colored veins immediately above. By repeated crazing of the glaze and successive treatment with different dyes variegated effects may be produced.

My invention consists in the steps of the method and the resulting product hereinafter described and claimed.

In the accompanying drawings I have illustrated an embodiment of the invention as applied to a stoneware gearshift lever ball, in which the glaze is treated so as to produce colored veins on its surface, but it will be understood this is only by way of illustration, for my invention may be applied to any and all ceramic goods which have a glazed surface, such as tiles, vases and the like.

Referring to the accompanying drawings, which form a part of the specification;

Figure 1:
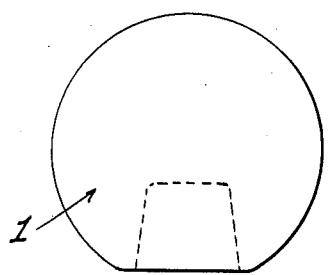
Figure 1 is an elevation of a gearshift lever ball.
Figure 2:
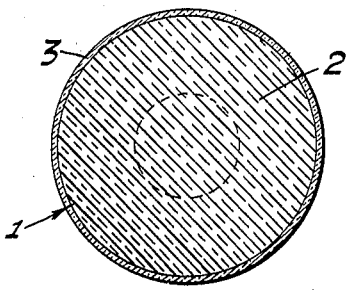
Fig. 2 is a cross section thereof, showing the glaze.
Figure 3:
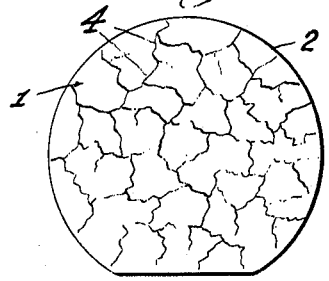
Fig. 3 is an elevation of the ball after the same has been subjected to a crazing treatment.
Figure 4:
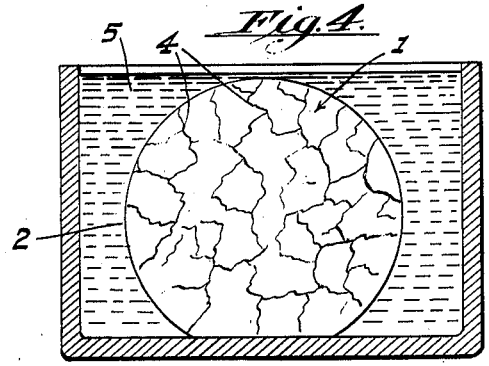
Fig. 4 is the ball shown in Fig. 3 immersed in a bath of dye.
Figure 5:
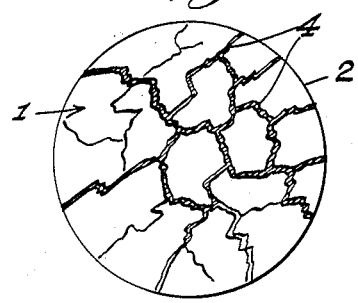
Fig. 5 is the ball showing the colored veins produced on its glazed surface.
Figure 6:
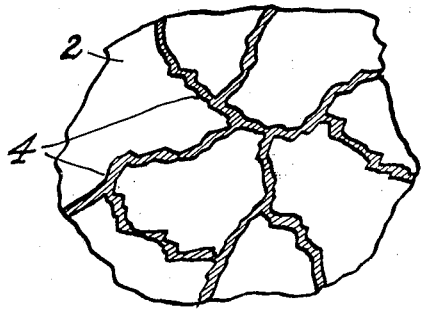
Fig. 6 is a detailed view showing the veins enlarged.
Figure 7:
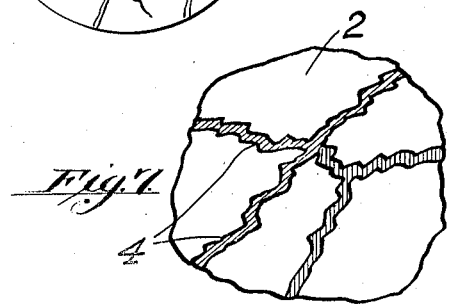
Fig. 7 is a detailed view showing different colors on the glaze.

The gearshift lever ball 1 consists of an interior clay body 2 and an exterior layer of glaze 3. The glaze is crazed by any convenient method. In the manufacture of the same the glaze may be applied which has a different coefficient of expansion from the body 2 and therefore will naturally craze on cooling, or where the glaze 3 is normal, that is, not crazed, crazing may be effected by simply heating the ball to 400° F. or higher and then quenching the same either by cold air or liquid. The sudden contraction of the glaze will cause crazing, that is, minute cracks 4 in irregular vein like shapes. The ball is then immersed in a dye 5, preferably while still hot and while the cracks are open, facilitating the reception or penetrating of the dye within the cracks. A few minutes are ordinarily sufficient for the penetration of the dye into the cracks. If a longer period of time is used the dye will diffuse in the porous body 2 of the ball and color the same. The ball is then removed from the dye bath and wiped to remove the dye adhering to the surface thereof. The appearance of the ball will then be as shown in Fig. 5 where the ball has been immersed for a sufficient time only to cause the cracks 4 to be filled with the dye. I prefer to quench the heated balls in the dye 5, omitting the separate step of quenching. If a variegated effect is desired, the ball may be subjected to repeated treatments of crazing and dyeing and subjected to baths of dyes of different color.

The method may be modified by having the first bath penetrate into the body, at least in part, and below the cracks, forming bands of dimmer shade underneath the glaze 3, and the subsequent treatment with a different color dye may fill the cracks only without penetrating into the body, producing a pleasing effect.

It will be understood that the method just described may be applied to any ceramic goods, such as tiles, vases and the like that are provided with a surface glaze.

Various changes may be made in the steps of the method by those skilled in the art without departing from the spirit of my invention as claimed.

I claim:

1. A method of treating glazed ceramic wares comprising applying to ceramic ware having a crazed glaze liquid coloring matter until the coloring matter has penetrated through the crazed enamel to the body of the ceramic ware.

2. A method of treating glazed ceramic wares comprising applying to ceramic ware having a crazed glaze liquid coloring matter until the coloring matter has penetrated through the crazed enamel to the body of the ceramic ware and is diffused at least in part on the body of the ceramic ware.

3. A method of treating ceramic ware comprising applying to the ceramic ware having a crazed glaze a dye until the dye has penetrated through the crazed enamel to the body of the ceramic ware and repeating the process with a dye of different color.

4. A method of treating ceramic ware having a glaze surface comprising heating the ceramic ware, quenching the same to cause the glaze to craze and applying a liquid dye to the ceramic ware until the liquid dye has penetrated through the crazed enamel to the body of the ceramic ware.

5. A ceramic ware having a crazed glaze, the minute cracks of said glaze filled at least in part with coloring material.

6. A ceramic ware having a crazed glaze, the minute cracks of which are filled with different colored material.

7. A ceramic ware having a crazed glaze, the minute cracks of which are filled with a coloring material, at least in part, and having the body of the ceramic ware adjacent the cracks colored.

In testimony whereof I have signed my name to this specification.

LYNN B. BERNHEIM.